Feb. 11, 1947.                 H. L. BARNEY                 2,415,405
STABILIZING CIRCUIT FOR SYNCHRONOUS MOTORS
Filed April 12, 1944
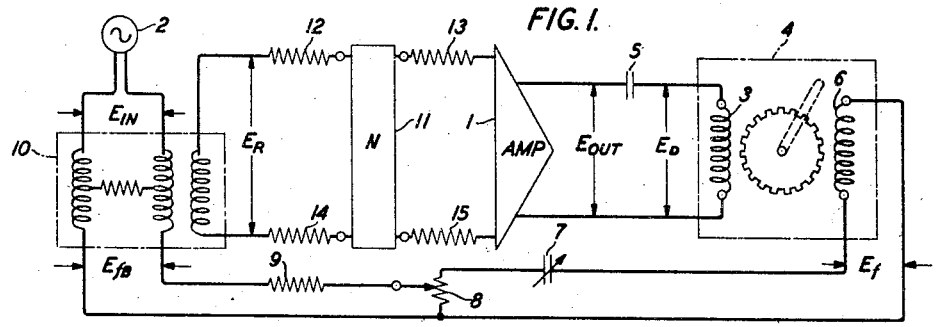
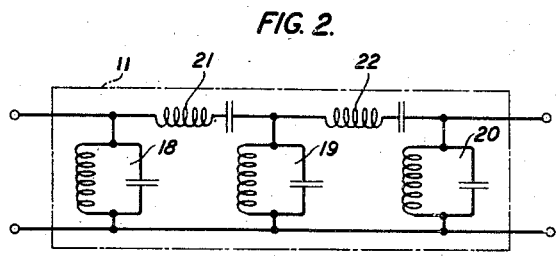
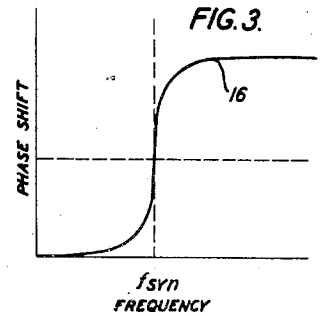
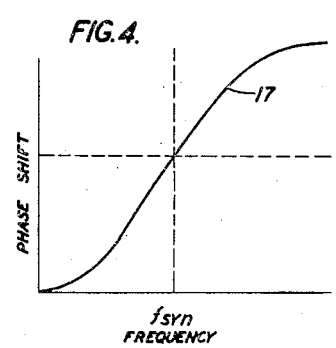
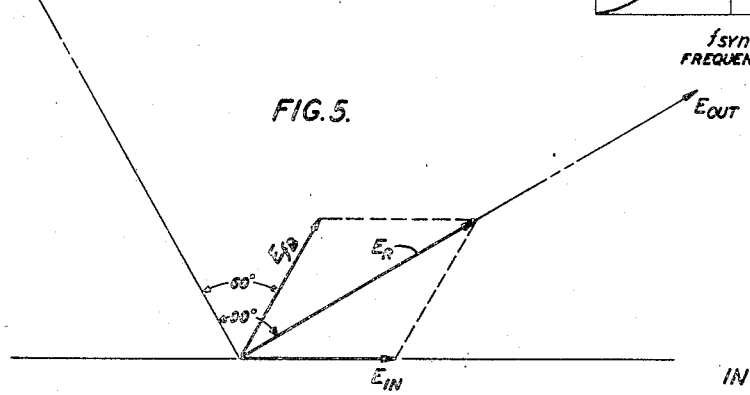
INVENTOR
*H. L. BARNEY*
BY *W. C. Parnell*
ATTORNEY Patented Feb. 11, 1947

2,415,405

UNITED STATES PATENT OFFICE 2,415,405

STABILIZING CIRCUIT FOR SYNCHRONOUS MOTORS

Harold L. Barney, Madison, N. J., assignor to Bell Telephone Laboratories, Incorporated, New York, N. Y., a corporation of New York Application April 12, 1944, Serial No. 530,694

4 Claims. (Cl. 172—274)

1

This invention relates to synchronous motor systems and particularly to means for stabilizing the operation of such motors.

As is well known the rotor of a synchronous motor driving a variable load hunts or oscillates about its true synchronous position with respect to the revolving field produced by the driving circuit and many proposals have been made heretofore to reduce this hunting action. In one known type of system the motor is driven by the output of a vacuum tube amplifier at a speed determined by the frequency of an alternating current control source associated with the input of the amplifier and the motion of the rotor generates an alternating voltage which is applied to the input of the amplifier in the proper sense to produce a damping effect on the hunting action of the rotor.

The object of this invention is to reduce still further the time required for the rotor of such a motor to reach the steady state condition when subjected to a change of load.

According to the invention the stability of such a motor is increased by properly adjusting the phase of the feedback voltage with respect to the voltage applied from the control source and by delaying the propagation around the feedback loop of the phase changes in the feedback voltage produced by the hunting excursions of the rotor. The required delay is conveniently obtained by means of a high Q network having a phase shift which increases rapidly with frequency in the region of the driving frequency. In one instance using this circuit, the time required for the rotor to return to the steady state condition after being subjected to transient forces was less than one-tenth the time required with prior feedback control circuits.

In the drawing:

Fig. 1 is a motor driving circuit according to the invention;

Fig. 2 is a typical network for use in the circuit of Fig. 1;

Figs. 3 and 4 are phase shift characteristics of networks suitable for the driving circuit; and Fig. 5 is a vector diagram of the voltages in various parts of the circuit.

In Fig. 1, control current is applied to the input of the amplifier 1 from a source 2 of the desired control frequency such as, for example, 200 cycles per second and the output of the amplifier is connected to the driving coils 3 of the motor 4 to be controlled through a suitable condenser 5 which tunes the driving circuit to the applied frequency in order to obtain an efficient

2 transfer of power from the amplifier to the motor. The rotation of the rotor generates in the coil 6 an alternating potential which in the steady state condition is of the same frequency as the source 2. The coil 6 is connected through a phase adjusting condenser 7 and amplitude adjusting resistors 8 and 9 to the input circuit of the amplifier 1. This feedback circuit and the control circuit from the source 2 are preferably associated with the amplifier in conjugate relation by means of a hybrid coil 10 or its equivalent so that the feedback circuit cannot react on the standard frequency source 2.

The network 11 is preferably of a type which produces a phase shift which increases rapidly and linearly with frequency over a range on either side of the driving frequency. This effect is best obtained by means of a conventional narrow band-pass filter of the type shown in Fig. 2 where the shunt arms 18, 19 and 20 are antiresonant and the series arms 21 and 22 are resonant at the driving frequency. While only three sections are shown in Fig. 2 it will be understood any number required to produce the desired phase shift characteristic may be used. In general, multisection networks will be required to produce a phase shift with frequency of the type shown by the curve 16 in Fig. 3 whereas characteristics of lesser slopes such as curve 17 of Fig. 4 may be obtained with fewer sections and in the limiting case the network may consist of only one shunt or one series arm of the type shown in Fig. 2.

This network theoretically may be connected into the circuit anywhere in the feedback loop but to be effective in producing the required phase shift and the corresponding time delay in propagation it is necessary, in accordance with known filter theory, that the network be terminated in impedances of the proper values. It is generally most convenient therefore to locate it in the high impedance input circuit of the amplifier as shown in Fig. 1 and particularly when the simpler forms of networks are used, building out resistors 12 to 15 may be used as required.

The manner in which this circuit operates to reduce hunting is as follows:

In Fig. 5 are shown a number of vectors representing the voltages designated in Fig. 1 in their steady state. Vectors $E_D$ and $E_{out}$ are not shown to scale. In an actual circuit $E_{out}$ will be many times the value of $E_R$ because of the gain of the amplifier and $E_D$ will be several times the value of $E_{out}$ due to output circuit tuning. Because of the tuning, the current in the coil 3 will be in phase with the voltage $E_{out}$ and, since the coil impedance is largely inductive, the voltage $E_D$ will lead voltage $E_{out}$ by about 90 degrees as shown.

With the feedback circuit open, the generated voltage $E_f$ will be in phase with the applied voltage $E_D$ and by means of the condenser 7 which is of larger capacity than required to resonate the feed back circuit, the voltage $E_{fb}$ fed back to the input of the amplifier may be adjusted to lag the voltage $E_f$ in phase by any desired angle such as 60 degrees. The two voltages $E_{in}$ and $E_{fb}$ then combine vectorially to produce the voltage $E_R$ at the input of the network 11, this voltage in the steady state being in phase with $E_{out}$ as already stated.

When the rotor of the motor is retarded momentarily, as by a sudden increase in the load, the voltages $E_f$ and $E_{fb}$ will also be retarded in phase and this will cause the voltage $E_R$ to lag behind (in the clockwise direction) the position shown in Fig. 1.

However, due to the time required to propagate a signal through the high Q network 11, $E_{out}$ will not respond instantaneously to the change in the phase of the input to the network so that for a period depending on the propagation time the angle of lag between the rotor and the driving voltage will be greater than it would be in the absence of the network. Since the torque of a synchronous motor is proportional to the latter angle of lag it will be seen that the delay introduced by the network produces an increase in the torque on the rotor which tends to restore it to synchronous position.

When the rotor of the motor tends to move ahead of its proper steady state position with respect to the stator field, as for example, when the load is suddenly reduced, the voltages $E_f$ and $E_{fb}$ are advanced in phase and the resultant voltage $E_R$ advances in phase from the position shown in Fig. 1. As before this phase change does not immediately produce a corresponding change in the phase of the voltage applied to the motor so that the angle of lag between the rotor and the stator field is now less than it would be in the absence of the network. This reduction in the angle of lag immediately reduces the torque acting on the rotor causing it to fall back into its proper position with respect to the stator field. When in falling back the rotor is carried beyond its proper position the torque is increased again in the manner already described.

It is therefore seen that the delay in the response of the voltage $E_{out}$ to phase changes in the input circuit allows the torque to change instantaneously in the proper direction to oppose the transient forces tending to produce hunting.

While it was found in one particular system that the greatest stability was obtained by adjusting the feedback voltage to an angle of 60 degrees lagging with respect to the voltage applied to the stator, this may not be true of all systems of this type. Similarly, it is quite probable that the optimum phase shift characteristic of the delay network will vary with other constants of the system. However, in any given system the best values for these factors can be determined quite readily by empirical methods.

What is claimed is:

1. In a synchronous motor drive the combination with a source of control voltage of standard frequency, an amplifier having an input circuit connected to the source and an output circuit connected to the motor, means responsive to the rotation of the motor for generating a voltage of the standard frequency, and a circuit for feeding back the generated voltage to the input of the amplifier, of means for adjusting the phase of the voltage fed back to the amplifier, and means for producing a predetermined delay in the propagation to the output circuit of changes in the phase of the generated voltage produced by hunting action of the motor.

2. In a synchronous motor drive the combination with a source of control voltage of standard frequency, an amplifier having an input circuit connected to the source and an output circuit connected to the motor, means responsive to the rotation of the motor for generating a voltage of the standard frequency, and a feedback loop including a path between the generating means and the input circuit, of means for reducing the time required for the motor to return to steady state operation after being subjected to a change of load comprising means for adjusting the phase of the feedback voltage applied to the input circuit to a predetermined angle of lag with respect to the control voltage, and a high Q network in the feedback loop resonant at the standard frequency.

3. In a stabilizing system for a synchronous motor the combination with a source of standard frequency for determining the speed of the motor, an amplifier connecting said source to the motor means associated with the motor for generating an alternating voltage having a steady state frequency equal to the frequency of the source and a feedback circuit including a path for applying the alternating voltage to the input of the amplifier of means in the feedback circuit for controlling the phase of the generated voltage applied to the amplifier, and means for delaying the effect on the voltage applied to the motor of transient phase changes in the voltage generated by the motor.

4. In a stabilizing system for a synchronous motor the combination with a source of alternating current connected to the input circuit of the motor, means for generating an alternating current of a frequency proportional to the instantaneous speed of the motor and normally equal to the frequency of the source and a feedback connection from the generating means to the input circuit to form a feedback loop, of a network in the feedback loop sharply anti-resonant at the frequency of the source, means for controlling the phase of the current in the feedback connection, and means for preventing reaction between the currents from the source and the generating means.

HAROLD L. BARNEY.